United States Patent [19]

Sutton

[11] Patent Number: 4,553,166
[45] Date of Patent: Nov. 12, 1985

[54] VIDEO SYSTEM WITH AUTOMATIC POWER UP

[75] Inventor: Leroy A. Sutton, Wheeling, Ill.

[73] Assignee: Zenith Electronics Corporation, Glenview, Ill.

[21] Appl. No.: 559,166

[22] Filed: Dec. 7, 1983

[51] Int. Cl.⁴ .............................................. H04N 3/18
[52] U.S. Cl. .............................................. 358/190
[58] Field of Search ................. 358/190; 315/411; 455/343

[56] References Cited

U.S. PATENT DOCUMENTS 3,882,401  5/1975  Cleland .............................. 325/492
3,956,669  5/1976  Del Ciello ......................... 358/190
4,422,178  12/1983  Mori .................................. 455/343

*Primary Examiner*—John C. Martin
*Assistant Examiner*—Howard L. Carter

[57] ABSTRACT

A high brightness mobile video system includes a standby circuit for maintaining a low CRT filament heater circuit current from a battery supply. The standby circuit monitors an input circuit for video signals. On receipt of a video signal, the standby circuit operates a relay to energize a switch mode power supply which further energizes the deflection circuit for the CRT, couples full operating current therefrom to the filament heater circuit, and enables the CRT video drive circuits.

8 Claims, 1 Drawing Figure

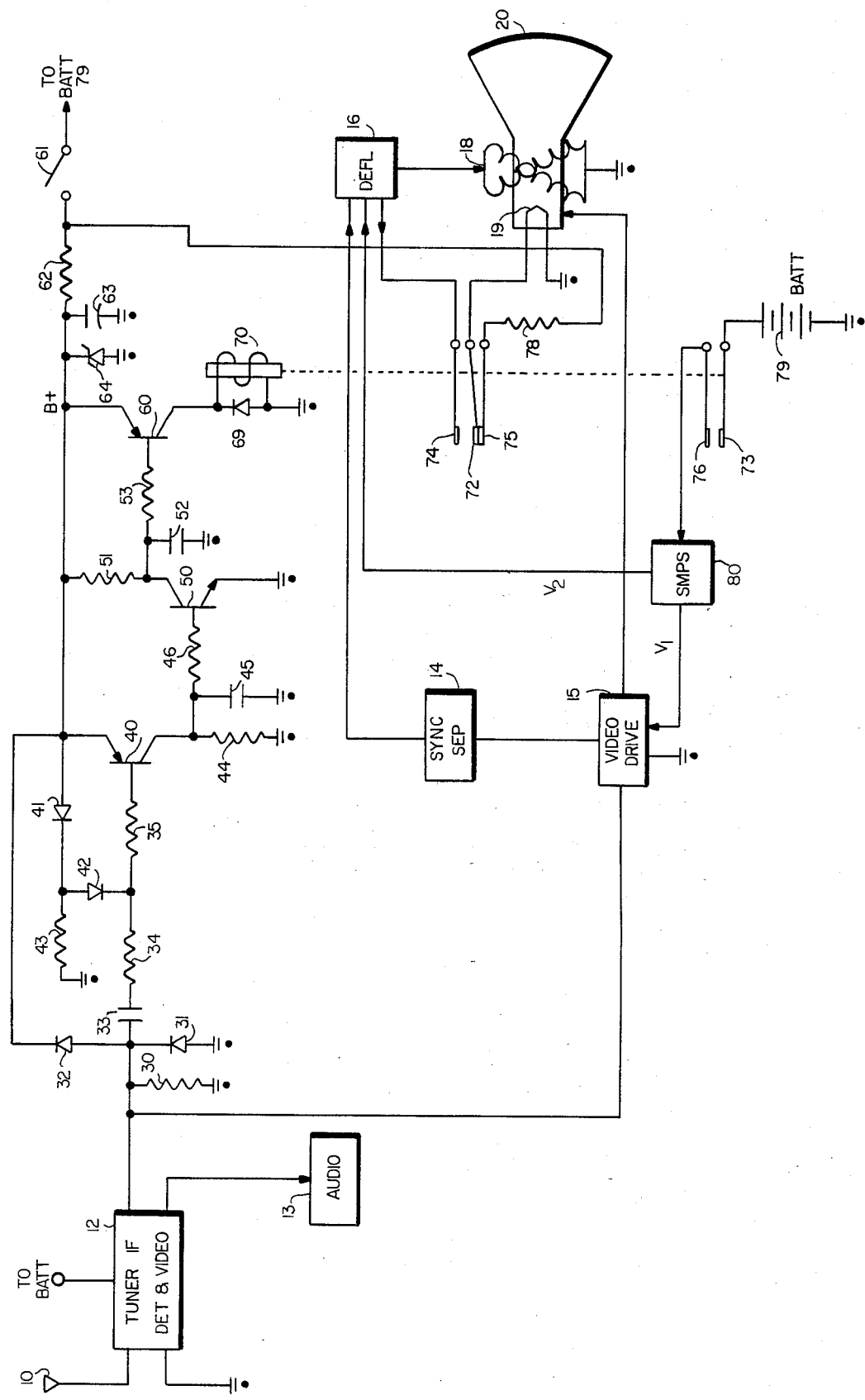

VIDEO SYSTEM WITH AUTOMATIC POWER UP

BACKGROUND OF THE INVENTION AND PRIOR ART

This invention relates generally to video systems and particularly to video systems used in mobile environments such as vehicles.

There has been increasing interest in the use of video monitors and the like for conveying information via RF transmissions to receiving units employed in police vehicles, fire engines and the like. These systems use cathode ray tubes (CRT's) having high brightness capabilities which unfortunately very often lead to relatively short service lives. Such systems necessarily derive their operating power from the vehicle battery. With a high brightness video system, a great deal of power is consumed by the CRT and driver circuitry, as distinct from the RF and small signal processing circuits. Consequently, the use of high brightness video systems in mobile installations imposes a substantial load on the vehicle's battery system.

OBJECTS OF THE INVENTION

Accordingly, a principal object of the invention is to provide a novel video system for mobile use.

Another object of the invention is to provide a video system for mobile use which reduces power consumption requirements.

A further object of the invention is to provide an economical high brightness video system.

A further object of the invention is to provide a high brightness video system that maximizes CRT life.

SUMMARY OF THE INVENTION

In accordance with the invention a high brightness video system comprises a CRT having a filament circuit, a first power supply means energizing the filament circuit at a level significantly below normal, a second power supply means energizing the filament circuit at a normal operating level and means responsive to an input signal for switching between said first and said second power supplies.

BRIEF DESCRIPTION OF THE DRAWINGS

Other objects and advantages of the invention will become apparent upon reading the following description in conjunction with the drawing, the single figure of which is a combined block and schematic diagram of a video system constructed in accordance with the invention.

DESCRIPTION OF THE PREFERRED EMBODIMENT

Referring to the drawing, an antenna 10 is connected to a tuner, IF, detector and video circuit 12 which is supplied directly from a battery terminal, as indicated. It will be understood that tuning block 12 may contain a conventional television receiver "front end" or any other suitable RF responsive circuit for receiving over-the-air RF communications and developing therefrom video information, audio information and synchronizing information for controlling an audio system and the video display of the information. To that end, receiver 12 has one output supplying an audio circuit 13, and another output supplying a video driver stage 15 which provides high level video drive to a cathode ray tube 20 and supplies a synchronizing signal separating circuit 14 which, in turn, supplies a deflection circuit 16. Cathode ray tube 20 includes a deflection yoke 18, coupled to deflection circuit 16, and a filament heater circuit 19. The circuitry thus far described is conventional and well known in the art.

In accordance with the invention, means are provided for maintaining the cathode ray tube filament heater circuit in a warm condition for providing instantaneous CRT operation and for maintaining a standby circuit responsive to video input signals for switching over to a switch mode power supply. The switch mode power supply provides power to the deflection circuit, which thereby provides a magnetic beam deflection field and supplies full power to the CRT filament circuit, all in a conventional manner. The switch mode supply also energizes the video drive circuit and maintains energization of the standby circuit.

An output is also taken from tuning block 12 to a resistor 30, which is connected to ground in a standby circuit. Resistor 30 provides appropriate signal loading and is connected to the junction of a pair of diodes 31 and 32 connected between B+ and ground. It should be noted that B+ and Battery are distinct, even though they may have the same DC potential. The diodes provide static discharge protection. The junction of the diodes is further connected, through a series connection of a capacitor 33 and a pair of resistors 34 and 35, to the base of a transistor 40. Transistor 40 has its emitter connected to B+ and its collector connected to the junction of a grounded load resistor 44. A capacitor 45 is connected in parallel with load resistor 44 and a resistor 46 connects the collector of transistor 40 to the base of transistor 50. The input circuit of transistor 40 comprises a diode 41 connected from B+ to the junction of a grounded resistor 43 and to a diode 42 connected to the junction of resistors 34 and 35. Diode 41 is of the silicon type and develops approximately a 0.7 volt drop across its terminals. Diode 42, on the other hand, is a germanium type, and requires only a 0.2 volt drop. The combination of diodes 41 and 42 enables a low input signal response, on the order of 0.2 volt, for transistor 40. This assures response of the standby circuit to low amplitude incoming video signals. In practice, the low response characteristic enables transistor 40 to respond even in the absence of video signal so long as a sync signal is present. Capacitor 45 and resistor 46 comprise an integrating network for developing a steady state voltage from the sync pulse input to help maintain transistor 50 conductive under that condition.

The collector of transistor 50 is connected to B+ through a resistor 51 and its emitter is connected to ground. The collector is also connected to a filter circuit comprising a grounded capacitor 52 and a resistor 53 connected to the base of a transistor 60. Transistor 60 has its emitter connected to B+ and its collector connected to ground through a relay winding 70 having a protection diode 69 connected thereacross. A switch 61 is connected through a filter circuit, consisting of a resistor 62 and a capacitor 63, between B+ and battery 79. A zener diode 64 is included for voltage regulation. As will be seen, switch 61 enables system operation by activating the standby circuit and energizing the CRT filament circuit.

Relay 70 operates a plurality of contacts 72-76. Common contact 72 is connected to the filament circuit 19 of CRT 20 and contact 73 is connected to a battery 79, which may be the vehicle battery. Normally-closed contact 75 is connected through a small resistor 78 to switch 61. As can be seen by tracing out the schematic diagram, power from battery 79 is supplied to filament circuit 19 through switch 61, resistor 78 and closed contact 75/72. Power from the battery is also supplied to B+, as mentioned previously, to power the standby circuit. Normally-open contact 76 is connected to switch mode power supply (SMPS) 80 and normally-open contact 74 is connected to the filament supply output of deflection circuit 16. Power supply 80 includes two voltage output terminals for supplying $V_1$ potential to video drive circuit 15 and $V_2$ potential for operation of deflection circuit 16.

In operation, a small video signal, on the order of 0.2 volts or more, from the video circuit in tuning block 12 drives transistor 40 conductive which, in turn, drives transistor 50 conductive and provides a relatively constant input signal voltage for the input of transistor 60. Therefore, in the event of a momentary signal dropout, transistor 60 will remain conductive. When transistor 60 conducts, its load current energizes relay 70 causing the normally-closed contacts to open and the normally-open contacts to close. Thus, contacts 72/75 open, whereas contacts 73/76 and 72/74 close. When the contacts open, the low current DC path to the filament circuit 19 of CRT 20 is broken. At the same time, switch mode power supply 80 is energized by closure of contacts 73/76 to generate voltages $V_1$ and $V_2$ for powering the video drive circuitry, and for activating deflection circuit 16. Deflection circuit 16, in a well known manner supplies full heater current, via closed contacts 72/74, to filament circuit 19 which reaches operating temperature instantly since the filament circuit has been maintained partially energized. Consequently, full power is applied to CRT 20 for normal high brightness operation as long as a video input signal of sufficient magnitude is obtained from tuning block 12.

As mentioned briefly, switch 61 is provided for standby circuit and partial filament operation from battery 79. Full operation is provided in the presence of a video input signal. A master switch (not shown) would also normally be provided for shutting down the receiver section, as well as the standby circuit, when the video system is not needed, such as when the vehicle is not in service. Operation of the system without activation of the standby circuit can be readily accomplished by simply overriding relay contacts 73/74 and 72/74.

Thus, the invention provides a system for minimizing the power consumption in a high brightness video system and for maximizing CRT life by bringing the CRT to full operating power only when information is being received. It is recognized that numerous changes and modifications in the described embodiment of the invention will be apparent to those skilled in the art without departing from the true spirit thereof. The invention is to be limited only as defined in the claims.

I claim:
1. A high brightness video system comprising:
    a CRT including a filament circuit;
    first power supply means for energizing said filament circuit at a below normal level;
    second power supply means for energizing said filament circuit at a normal level; and
    means responsive to an input signal for switching between said first and said second power supply means, said first power supply means comprising a battery and said second power supply means comprising a switch mode power supply.
2. The system of claim 1 further including deflection means for normally supplying said filament circuit, said deflection means being powered by said switch mode power supply.
3. The system of claim 2 wherein said switching means includes standby circuit means responsive to a video signal input.
4. The system of claim 3 wherein said switching means comprises a relay energizable from said standby circuit means; said relay, upon energization, activating said second power supply means for providing fully power to said CRT.
5. The system of claim 4 wherein said switching means include a transistor amplifier having low signal sensitivity for responding to low level video signals.
6. The system of claim 5 wherein said transistor amplifier has an input circuit including a silicon diode connected in series with a germanium diode.
7. A high brightness video system comprising tuner means for receiving RF signals;
    a CRT having a filament heater and deflection means;
    a battery;
    a current limiting resistor;
    a switch mode power supply;
    a relay for selectively connecting said battery in circuit with said filament heater and said current limiting resistor, and in circuit with said switch mode power supply, said filament heater being operated at below normal temperature when in circuit with said current limiting resistor;
    standby means including an amplifier coupled between said tuner means and said relay and operable from said battery for energizing said relay in response to video signals of a given amplitude from said tuner means;
    said relay upon energization: energizing said switch mode power supply to power said deflection means therefrom; disconnecting said battery from said filament heater; and connecting said deflection means directly to said filament heater for operating said filament heater at normal temperature.
8. The video system of claim 7, further including video drive means for said CRT, and wherein said video drive means are powered from said switch mode power supply.

* * * * *